United States Patent
Castellon

(10) Patent No.: US 7,056,033 B2
(45) Date of Patent: Jun. 6, 2006

(54) DEVICE FOR CONNECTING OPTICAL FIBRES TO LIGHT EMITTER AND RECEIVER CIRCUITS

(76) Inventor: Melchor D. Castellon, Diputacion, 455-457, E-08013 Barcelona (ES)

(*) Notice: Subject to any disclaimer, the term of this patent is extended or adjusted under 35 U.S.C. 154(b) by 241 days.

(21) Appl. No.: 10/477,464

(22) PCT Filed: Jan. 16, 2003

(86) PCT No.: PCT/ES03/00017

§ 371 (c)(1),
(2), (4) Date: Nov. 12, 2003

(87) PCT Pub. No.: WO03/062893

PCT Pub. Date: Jul. 31, 2003

(65) Prior Publication Data

US 2004/0136659 A1 Jul. 15, 2004

(30) Foreign Application Priority Data

Jan. 24, 2002 (ES) .................................. 200200150

(51) Int. Cl.
*G02B 6/36* (2006.01)
(52) U.S. Cl. .............................. 385/88; 385/89; 385/92
(58) Field of Classification Search ................ 385/88, 385/89, 92
See application file for complete search history.

(56) References Cited

U.S. PATENT DOCUMENTS

| 4,118,100 | A | 10/1978 | Goell et al. .................... 385/92 |
| 5,032,898 | A | 7/1991 | Bowen et al. ................ 257/433 |
| 5,631,987 | A | 5/1997 | Lasky et al. .................... 385/88 |
| 6,603,782 | B1* | 8/2003 | Nakanishi et al. ............. 372/36 |
| 6,652,154 | B1* | 11/2003 | Shirakawa et al. ............ 385/70 |
| 6,692,161 | B1* | 2/2004 | Zaborsky et al. .............. 385/92 |
| 6,932,516 | B1* | 8/2005 | Ouchi et al. ................... 385/88 |

FOREIGN PATENT DOCUMENTS

| GB | 2 005 860 A | 10/1978 |
| GB | 2 005 860 A1 | 4/1979 |
| JP | 59128009 A * | 7/1984 |

* cited by examiner

*Primary Examiner*—Sung Pak
*Assistant Examiner*—Daniel Petkovsek
(74) *Attorney, Agent, or Firm*—Dickstein, Shapiro, Morin & Oshinsky, LLP.

(57) ABSTRACT

The invention relates to a device for connecting optical fibers to light emitter and receiver circuits. The inventive device comprises a light emitter diode (4) and a light receiver diode (5) which are soldered to a printed circuit (6) and which are covered by a cap (7, 8). Said cap is provided with an opening into which one end (9, 10) of a small section (11, 12) of optical fiber is inserted. The opposite end (13, 14) of each section is inserted into a connector (17) which also receives the ends (2, 3) of the main optical fiber conductor (1) at the other side thereof. The aforementioned connector comprises internal projections (21, 22) which are used to center the ends (13, 14, 2, 3) of the optical fiber conductors inside said connector (17).

10 Claims, 1 Drawing Sheet

DEVICE FOR CONNECTING OPTICAL
FIBRES TO LIGHT EMITTER AND
RECEIVER CIRCUITS

FIELD OF THE INVENTION

The present patent application is a 371 of PCT/ES03/00017, filed Jan. 16, 2003 which claims the priority of Spanish application P0200150 filed Jan. 24, 2002.

The present patent application relates, as stated in its title, to a "DEVICE FOR CONNECTING DIRECT ANTIPINCHING SYSTEMS" which novel manufacturing, conformation and design features fulfil the purpose to which it has been specifically conceived, with a maximum safety and effectiveness.

BACKGROUND OF THE INVENTION

Direct anti-pinching systems are essentially based on the modification of the light conductivity of optical fiber to modify operation of the driving motor of, for example, the power window system of a motor vehicle, by either stopping or reversing the direction of rotation of the driving motor when an obstacle has been detected in the movement of the window pane.

The optical fiber conductor carries a beam light therewithin so that it is bouncing therealong describing an irregular path. As consequence, the index of refraction increases while the index of reflection decreases leading to modifications in light transmission. The inner surface of the optical fiber conductor used as a sensor of the direct anti-pinching system works as a prism, reflecting and refracting the flow of light which is supplied by a light emitting diode that is coupled to the corresponding integrated circuit board and to the end of the optical fiber. At the other end of the optical fiber a light receiving diode is coupled for receiving the light from said light emitting diode.

The quantity of light received by the light receiving diode is detected by means of a microcomputer adapted to transform the optic signals into electric signals which have been previously amplified by an amplifier. The direct anti-pinching system is provided with electronic elements which serve the purpose of taking decisions based on this principle of light conductivity. The flow of light may be self-adjusted by providing an adjustable photodiode as a light emitting diode in the optical fiber conductor. Therefore, the light receiving diode is always receiving the same quantity of light so that any changes in the quantity of emitted light when the window of the power window system is moving will be automatically detected. By way of an example, when raising the window pane, if an obstacle is found, for example the hand of an occupant of the vehicle, the loops in the optical fiber conductor are subjected to a compressing elastic deformation so that the quantity of light therein is modified, and a signal is sent to the driving means of the power window system so that the motor is stopped or its direction of rotation is reversed.

Connection of the sensor of the direct anti-pinching system which comprises, as stated above, an optical fiber conductor, is extremely important in the operation thereof as the connection should be effectively and strongly made in such a way that there are neither noise nor vibrations which may adversely affect the system.

In prior art, connection of optical fiber conductor to the printed circuit board was carried out by basically using an encapsulated connector member inside of which the ends of the main optical fiber conductor were arranged, that is, the optical fiber conductor acting as a sensor in the direct anti-pinching system. Said connector was adapted to be coupled directly to the light emitting diode and the light receiving diode welded to the printed circuit board.

BRIEF SUMMARY OF THE INVENTION

The main disadvantage of the previously described conventional connecting devices is that connection between the sensor and the diodes is not always effective. The applicant has found a configuration that is notably more effective for the optical connection in direct anti-pinching systems as it will be described hereinafter in the present specification. With the device according to the present invention great improvements are achieved in terms of tightness, robustness, effectiveness in the connection, reduction in vibrations and protection against dirt, as well as reduction of assembly and manufacturing costs.

For this purpose, the invention provides a connecting device for direct anti-pinching systems, that is to say, systems that, as stated before, comprise a main optical fiber conductor fitted inside a sheath disposed along the doorframe of a motor vehicle with the purpose of acting on the mechanism of a power window system (or any other devices of similar opening) in the case of block, pinching or anomaly.

The connecting device of the invention essentially comprises light emitting and receiving diodes coupled to a printed circuit board and which are each covered by a capsule. Each of these light emitting and receiving diodes are connected to the ends of the main optical fiber conductor forming the sensor of the direct anti-pinching system.

The main feature of the connecting device for direct anti-pinching systems of the invention is that said capsules are provided with a hole inside of which a first end of at least a section of the optical fiber conductor is inserted while the second opposed end of said section of the optical fiber conductor is inserted at an aerial connector inlet.

Inside this aerial connector said second end of the optical fiber conductor section and the end of the main optical fiber conductor are in abutment.

The printed circuit board of the device herein described according to the invention is delivered with the optical fiber conductor sections inserted in the respective capsules inside of which a light emitting diode and a light receiving diode are provided welded to the board. The operator only has to couple the aerial connector to the second end of said section projecting out of each capsule of the printed circuit board. The end of the main optical fiber conductor is then appropriately inserted inside the aerial connector coaxially with said second end of the fiber section so that contact is thus established.

As it can be seen, with a simple assembly operation a quick and reliable connection is obtained.

Preferably, said aerial connector is provided, in a substantially intermediate portion within each connection inlet, with protrusions arranged opposed to each other. Such protrusions, for example two, serve as a guide and stop for the second end of the optical fibre conductor section and the end of the main optical fibre conductor, respectively.

In an alternative embodiment of the connecting device for direct anti-pinching systems of the present invention, each capsule is provided advantageously with an external coating of a reflective nature, which may be coloured white, silver or similar colour with the purpose of reducing loss of light in connection.

Additionally, each of the capsules may be provided with an external coating extending beyond thereon disposed on said first end of the optical fiber conductor section covering a part thereof. This coating has an essentially progressive, conical configuration on the first end of the optical fiber section and it serves the purpose of reducing loss of light in the optic connection even in the case the optical fiber conductor section is bent, thus avoiding generation of false signals.

With the described connecting device it is possible to significantly reduce assembly and manufacturing costs of the anti-pinching system since the optical fiber-fiber connection facilitates assembly and connecting operations. The device of the invention also avoids the problems of vibration in the conventional devices while keeping strong sealing conditions, preventing powder, dirt, water and other external agents from entering therein.

BRIEF DESCRIPTION OF THE DRAWINGS

A preferred embodiment of a connecting device for direct anti-pinching systems according to the present invention is described below in detail and by way of a non limitative example, from which features and advantages thereof will be clearer. The following description is given according to the accompanying drawings, wherein.

Figure 1:
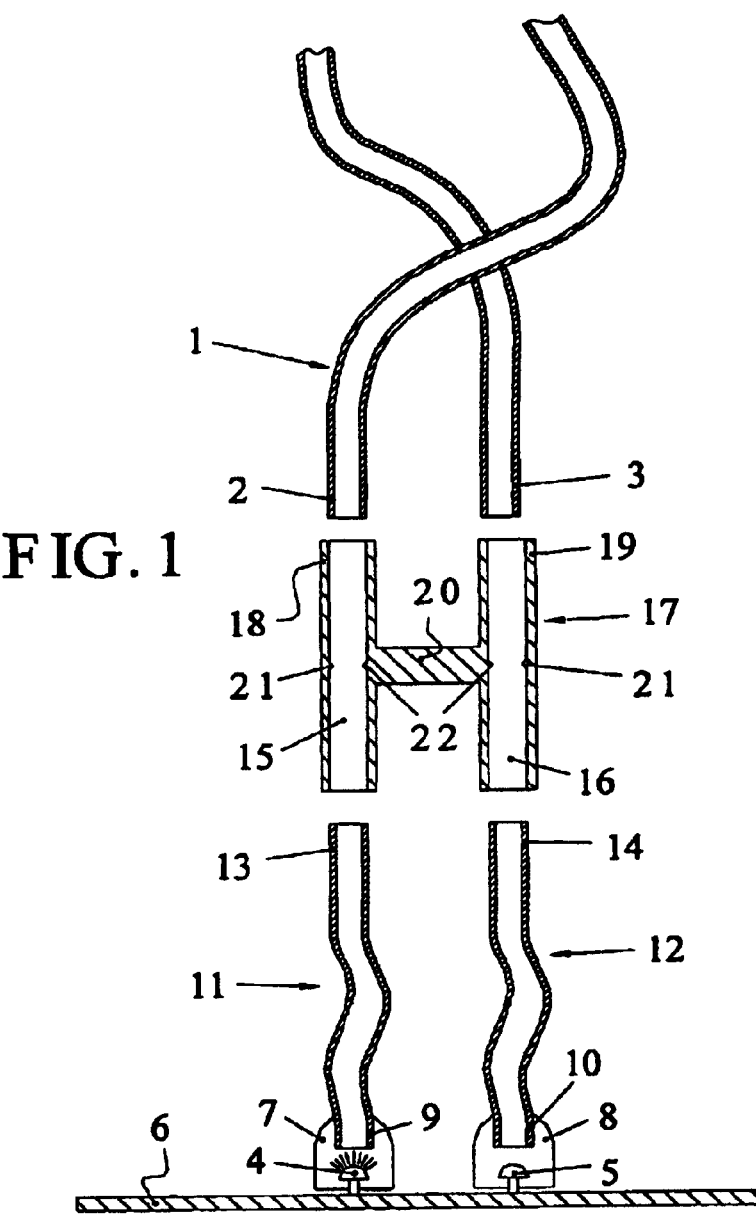
FIG. 1 is an elevational view of a first embodiment of a device according to the present invention, wherein the various parts thereof have been shown disconnected for better understanding.

The different references that have been used herein to describe the preferred embodiment of the device of the present invention are quoted hereinbelow:

(1) main optical fiber conductor;
(2) first end of the main optical fiber conductor;
(3) second end of the main optical fiber conductor;
(4) light emitting diode;
(5) light receiving diode;
(6) printed circuit board;
(7, 8) capsules of the diodes;
(9, 10) first end;
(11, 12) optical fiber conductor section;
(13, 14) second opposed end of the optical fiber conductor section;
(15, 16) aerial connector inlets;
(17) aerial connector;
(18, 19) parallel hollow cylinders of the aerial connector;
(20) traverse section of the aerial connector;
(21, 22) opposed projections acting as a guide and stop;
(23) external reflective coating of the capsules; and
(24) extended conical external coating.

DETAILED DESCRIPTION OF THE INVENTION

Embodiments of a device according to the invention for connecting a sensor of a direct anti-pinching system are herein described. Such sensor comprises a main optical fiber conductor (1) fitted inside a sheath disposed along the doorframe of a motor vehicle. The sensor serves the purpose of detecting anomalies on the operation of the power window system acting, as they occur, on the mechanism of said power window system (or any other devices of similar opening) in the case of block, pinching or anomaly. The main optical fiber conductor (1) comprises a single section having a first end (2) and a second end (3).

The connecting device of the invention essentially comprises a light emitting diode (4) and a light receiving diode (5) welded on a printed circuit board (6). The light emitting diode (4) and the light receiving diode (5) are both covered by respective capsules (7, 8).

Each capsule (7, 8) has a cylindrical hole inside of which a first end (9, 10) is suitably inserted having two sections (11, 12) of the optical fiber connector joined to each capsule (7, 8) by means of a resin.

The second opposed ends or free ends (13, 14) of said sections (11, 12) of the optical fiber conductor are inserted into respective inlets (15, 16) of an aerial connector (17). Said aerial connector (17) is an H-shaped connector formed of two parallel hollow cylinders (18, 19) joined by a traverse section (20).

Inside each cylinder (18, 19) of the aerial connector (17), on the one hand, the free ends (13, 14) of the sections (11, 12) of the optical fiber conductor leaving the circuit board (6) are inserted and, on the other hand, each end (2, 3) of the main optical fiber conductor (1) of the anti-pinching system are coaxially inserted.

The aerial connector (17) is provided, in a substantially intermediate portion within each cylinder (18, 19), with said aerial connector (17), two projections (21, 22) arranged opposed to each other acting as guide and stop for each free end (13, 14) of the sections (11, 12) of the optical fiber conductor and the ends (2, 3) of the main optical fiber conductor (1), respectively.

Figure 2:
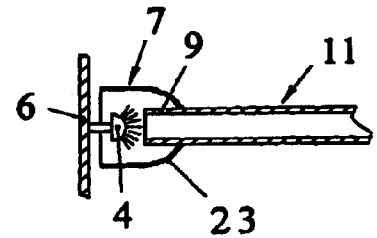
FIG. 2 is an elevational cutaway view of a second embodiment of the connecting device for direct anti-pinching systems according to the invention.
Figure 3:
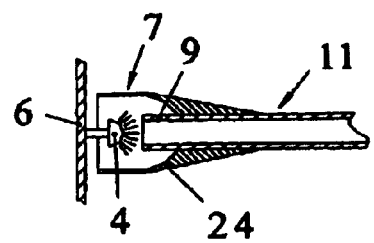
FIG. 3 is an elevational cutaway view of a third embodiment of the connecting device for direct anti-pinching systems according to the invention.
Figure 4:
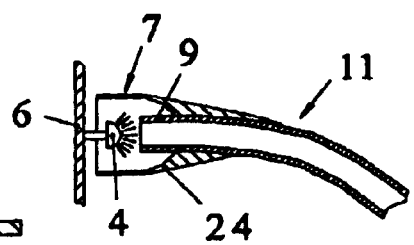
FIG. 4 is an elevational cutaway view of the embodiment of the connecting device of FIG. 3 but with the section of the optical fiber slightly bent to show the action of the capsule coating extension on the optical fiber.
Figure 5:
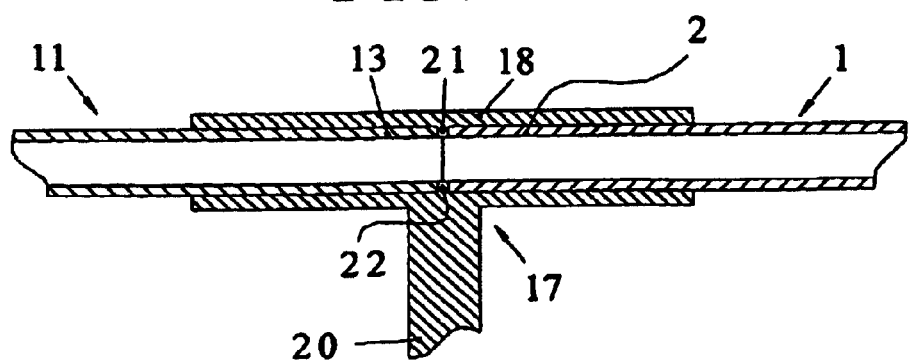
FIG. 5 is a cross section of one hollow cylinder of the aerial connector containing portions of the main optical fiber conductor and optical fiber conductor section and a portion of the transverse section of the aerial conductor.

In FIGS. 2, 3 and 4 alternative embodiments of the connecting device for direct anti-pinching systems of the invention are shown. In the embodiment of FIG. 2, capsules (7, 8) [only one of which has been herein illustrated] are provided with an external coating (23) of reflective nature coloured white, silver or similar colour with the purpose of reducing loss of light in connection.

In the embodiment of FIG. 3, capsules (7, 8) [only one of which has been illustrated] are provided with an external coating (24) extending beyond thereon disposed on the first end (9, 10) of the sections (11, 12) of the optical fiber conductor covering a part thereof. The coating (24) has an essentially progressive, conical configuration toward said first end (9, 10) of the sections (11, 12) of the optical fiber for reducing loss of light in the connection even in the case the optical fiber conductor section is bent as shown in FIG. 4, thus avoiding generation of false signals.

Once having been sufficiently described what the present patent application consists in accordance to the enclosed drawings, it is understood that any detail modification can be introduced as appropriate, provided that variations may alter the essence of the invention as summarised in the appended claims.

The invention claimed is:

1. A direct antipinching system comprising a sensor arrangement formed of a first pair of optical fiber conductors fitted inside a sheath carrying the light of emitting and receiving diodes, respectively, mounted on a printed circuit board covered by respective capsules, each member of the pair having a first end; a second pair of optical fiber conductors filled inside a sheath respectively carrying the light to and from a power window system of a motor vehicle and each member of which has a first end; and a single piece aerial connector comprising a pair of hollow cylindrical channels disposed in parallel, each of which extends from a first opening to a second opening, each of the first openings adapted to receive one of the first ends of the first pair of conductors and each of the second openings adapted to receive one of the first ends of the second pair of conductors whereby light in the first pair of conductors communicates with light in the second pair of conductors, and each hollow cylinder having a projection serving as a guide and stop for the first ends of the first and second conductors at a substantially intermediate portion therewithin.

2. A direct antipinching system according to claim 1 in which each of the hollow cylinders have a pair of opposing projections serving as a guide and stop for the first ends of the first and second conductors at a substantially intermediate portion therewithin.

3. A direct antipinching system according to claim 2 in which said capsules are provided with a reflective coating.

4. A direct antipinching system according to claim 3 in which said coating extends along a portion of the length of the first conductors and has a conical cross-section.

5. A direct antipinching system according to claim 4 in which the hollow cylinders are connected by a transverse section such that the aerial connector has a H shape, and the pair of opposing projections in each of the hollow cylinders are disposed at a portion of the cylindrical extent connected by the transverse section.

6. A direct antipinching system according to claim 3 in which the hollow cylinders are connected by a transverse section such that the aerial connector has a H shape, and the pair of opposing projections in each of the hollow cylinders are disposed at a portion of the cylindrical extent connected by the transverse section.

7. A direct antipinching system according to claim 2 in which the hollow cylinders are connected by a transverse section such that the aerial connector has a H shape, and the pair of opposing projections in each of the hollow cylinders are disposed at a portion of the cylindrical extent connected by the transverse section.

8. A direct antipinching system according to claim 1 in which the hollow cylinders are connected by a transverse section such that the aerial connector has a H shape, and the projection in each of the hollow cylinders is disposed at a portion of the cylindrical extent connected by the transverse section.

9. A direct antipinching system according to claim 1 in which said capsules are provided with a reflective coating.

10. A direct antipinching system according to claim 9 in which said coating extends along a portion of the length of the first conductors and has a conical cross-section.

* * * * *